UNITED STATES PATENT OFFICE 2,342,152

METHOD AND DEVICE FOR PRODUCING INTENSIFIED COLORS OR FOR INTENSIFYING THE PERCEPTION OF COLORS

Ferdinand Leiber, Berlin-Friedrichshagen, Germany; vested in the Alien Property Custodian No Drawing. Application September 22, 1937, Serial No. 165,091. In Germany September 29, 1936

8 Claims. (Cl. 95—2)

It is well known that the human eye is not equally sensitive to all colors of the spectrum.

The normal human eye has three fundamental color perception nerve groups the perception maxima of which lie near the spectral wave lengths 450, 550 and 650 m$\mu$, that is within those portions of the spectrum which are usually designed as blue, green and red. Light of any one of said three wave lengths acts essentially on only one of the three fundamental color perception nerve groups of the eye, whereas the remaining portions of the spectrum are each perceived by more than one fundamental perception group. For example, a light acting with equal intensity on the red and green perception nerve groups produces the impression of an intermediate yellow color, even if it does not contain any wave length of the yellow spectral portion. Similarly, blue and green appear as a bluish green by which, however, the red perception group is simultaneously affected, whereby a whitish appearance of the blue-green is produced.

It is the purpose of the present invention to substantially intensify the colors emitted from a colored object. According to the invention this purpose is attained by eliminating from the light rays emitted from the colored object substantially all rays not corresponding to one of the beforementioned perception maxima. Thus, the colored picture perceived by a human eye or recorded by a color photographic method, is substantially intensified and a very pleasant color saturation is accomplished. A further advantage is that many details become visible and can be photographed which otherwise could not be perceived at all.

The elimination of the undesired colors is effected either by illuminating the object by means of a light constituted exclusively of spectral waves of 450, 550 and 650 m$\mu$, or by filtering off from the light emitted by an object illuminated with normal light all colors with the exception of those of 450, 550 and 650 m$\mu$. Both methods can also be used in combination.

The color absorbing filters according to the invention may not only be used in the form of eye glasses, but may also be applied in the form of materials serving as admixtures to or bases or transparent covers for the objects. For example, a lacquer absorbing the minimum light regions situated between the maxima, or a cover glass, or a background supporting the coloring matter or a color admixture may produce the desired effect.

A special adaptation of the new method for photographic multicolor negative and positive processes consists therein, that for the exposition an illumination is used the color components of which correspond substantially to the apperception maxima of the eye, while the copying process is carried out with a light the color components of which correspond to the absorption maxima of the coloring materials forming the negative or the positive produced by a conversion process. Thus, an extraordinarily brilliant picture is attained, as not only the colors of the negative become precisely complementary and very saturated, but also the spectroscopic and sensitivity deficiencies of the light sensitive layer are corrected and rendered innoxious, as the negative (or conversion positive) has the most effective absorption for the rays to be absorbed.

Some examples of processes and devices according to the invention are as follows:

An illuminating device is combined of several electric discharge tubes producing a spectrum having interruptions between the apperception maxima. If precisely adapted discharge gases are available no filters are necessary and the illumination is effected in an economic manner. Three tubes each emitting one maximum may be used, or one of two tubes may emit two maxima.

Thus, the red light component may be emitted from zinc vapor, or from neon and may be freed from yellow emission by a neodymium glass filter. Blue and green light may be emitted from mercury vapor which likewise by a neodymium glass filter is freed from yellow rays, and, if necessary, by means of a separate filter, from any troublesome blue-green emission. It is also possible to use mercury only for blue and thallium for green, both discharge tubes being provided with filters absorbing the undesired rays.

Incandescent lamps can be used in a similar manner. For example, three lamps are each provided with a filter excluding all other rays than those corresponding substantially to the desired apperception maximum. Blue maximum light of 450 m$\mu$ wave length is produced with a filter of Schott glass BB6 one mm. thick or BG12 two mm. thick, red maximum light with a Schott glass RG5 two mm. thick, and green with a Schott glass OG4 two mm. thick combined with BG 18 two mm. thick. All three lamps project their rays simultaneously onto the object, and their intensities are so regulated that the combined light appears white.

Instead of glass filters, liquid filters or solid solutions of coloring matters in gelatine or the like can be used. The organic dyestuffs give an ample choice for this purpose, and in consequence of their very steep absorption curves the energy is economically utilized.

Some light filters allow of using the light of one lamp simultaneously for two maxima. For example, acid rhodamine (rhodamine S, U. S. A. Patents 402,436 and 425,504; Farbstofftabellen of Gustav Schultz, volume 1, Berlin 1932, No. 570) diluted in water or gelatine lets pass the red and blue maxima rays. A second lamp or tube is then used for green maximum light.

Neodymium glass (absorbing 580 m$\mu$), and a filter containing the yellow coloring matter tartrazine (tartrazine, U. S. A. Patent 324,630; Farbstofftabellen of Gustav Schultz, volume 1, Berlin 1932, No. 23) or a Schott glass OG4 two mm. thick (absorbing 500 m$\mu$) allow to produce a light corresponding to the red and green maxima. A second lamp is filtered to give maximum blue light, for example by Schott glass BG6 or BG12, and the intensity of both lamps is brought into optical equilibrium in order to obtain a light according to the invention.

One single source of light may produce all three maxima. A similar simplification is possible by means of other light sources being present in the neighborhood. For example, a mercury vapour tube is filtered so as to give the two maxima pure blue and pure green, and reddish light emitted from usual road or house lamps aids in producing a light entity of useful spectroscopic qualities, although in no way as good as light obtained with full use of the present invention.

For the observation of objects which are illuminated by daylight or other multicolor or omnicolor light emitted, for example, from unfiltered incandescent lamps, all the above mentioned filters may be used as spectacles or the like, provided only that, as far as possible, only small regions of rays besides the three maxima are allowed to pass in essential quantities.

For producing the maxima colors immediately on the objects, the undesired rays in the neighborhood of 580 m$\mu$ may be absorbed by neodymium oxide (in molten glass), or neodymium nitrate or other neodymium compounds soluble in water or in other usual solvents as in gelatine, collodion or oil lacquer (for lacquer coverings). The undesired rays in the neighborhood of 500 m$\mu$ may be absorbed by monobrom-fluorescein. Similar other materials, as for example succinyl-fluorescein or the halides thereof may also be used, as well as other materials still to be discovered by spectroscopic tests.

A special method for producing a coloring and filtering substance for absorbing the two light minima near 490 m$\mu$ and 590 m$\mu$ is the following:

3 gr. 6-chlorbenzoxazol (Amer. Journal 1932, page 42, or Bulletin de la Société Chemique de France, IV, vol. 133, page 1828) are heated to about 100° C. together with 2 cm.$^3$ methiodide for 8 hours in a tube, then broken and washed with acetone and thereafter with water and recrystallized from absolute alcohol. The product is a 6-chlorbenzoxazol-methiodide. 2.5 gr. of this product are dissolved in 20 cm.$^3$ dry pyridine and after addition of 3 cm.$^3$ ortho-formic-acid-ester, the solution is heated for one hour. After cooling, the produced crystals are removed and recrystallized from alcohol. Thus, a 5,5' dichloroxacarbocyanine-methiodide is obtained, which absorbs the light from 480 to 510 m$\mu$ and forms the first component of the desired coloring substance.

Then (according to British Patent 344,409, Imperial Chem. Ind. Ltd., London) 0.43 gr. raw 2'-$\omega$-acetanilido - vinyl - benzthiazol-methiodide are boiled with 0.3 gr. chinaldine-ethiodide and 2 cm.$^3$ dry pyridine for 25 minutes. Green crystals are produced by cooling and after separation recrystallized from alcohol. These crystals represent a 1,1'-diethyl-2-chinoline-2-thiazol-carbocyanineiodide which absorbs the light from 580 to 600 m$\mu$.

Both described substances are dissolved in acetone, the first at a concentration of 0.25% and the second 0.02%, and about 50 gr. of each solution are added to 400 gr. acetyl cellulose (Kahlbaum) and 2400 gr. acetone under slight heating. The product is fused on a glass plate for serving as a light filter according to the invention. Its separate constituents and other coloring matter produced under similar views may also be used for coloring any objects or photographic layers or for painting pictures.

Where a color basis is to be obtained from only two colors, for example a fabric having differently colored chain and weft yarns, one of said yarns may be green so as to absorb the whole spectrum with exception of the green maximum, and the other series may be red so as to absorb the entire part of the spectrum below the blue and above the red maximum.

For example the wefts may be colored with rhodamine and the chains with patent blue mixed with tartrazine.

In application to the production of photographic multicolor pictures, the new method consists in illuminating the object to be photographed by a light corresponding to the apperception maxima of the eye. The negative, thus produced, is precisely complementary to the colors of the object. If the negative consists, as usual, of three color layers representing red, green and blue, respectively, or if separate negatives each containing one of said layers are produced, the positve copying process is effected by a light containing mainly rays of those spectral portions which correspond to the absorption maxima of the colors in the negative. This may be effected by light mixed in the above mentioned way, or the different lights may be applied one after the other.

If an individual color of a negative has an absorption spectrum which is very different from the sensitivity spectrum of the appertaining (complementary) color portions of the positive, it is often advantageous to make the positive by aid of light rays which do not precisely correspond to the absorption maximum of the negative color but to a relative maximum of absorption. This relative maximum of absorption is a combination of the absolute maximum of absorption and of a complementary maximum of sensitivity in such way that with relation to the sensitivity of the positive layer the best absorption in the negative layer is attained. This means that the light elements to be absorbed are completely absorbed, as the light rays used nearly correspond to the absorption maximum and to the sensitivity minimum of the layer for the undesired color.

A practical example is the following: a multicolor object is illuminated by a light mixed from mercury vapor and neon discharge and filtered by neodymium glass, and photographed either on three single color negatives or on a combined three color negative of the Kodachrome or Agfa-color type, similar to that described for example in Geramn Patent 257,160. This negative may then be converted into a positive by usual exposing (without fixation), developing by a special developer whose oxides chemically produce the colors from the different constituents of the layers, and freed from silver. The positive thus gained has a special brilliance as all its portions correspond exactly to the preception maxima of the human eye. This brilliance can still be augmented by illuminating this picture by a light corresponding to that used for the exposure.

On the other hand, the negative, instead of being converted into a positive, may be completed to a complementary color negative by being developed with said special developer. The brilliant color negative obtained, in contradistinction to the known negatives of this type, which can not be reproduced positively, is very well adapted to be copied, as its colors are already purified and highly saturated. For copying purposes, the light is composed of those spectral portions which correspond to the absorption maxima of the color elements of the negative, if desired with a deviation towards that color group which is least sensitive for the complementary troublesome color of the positive color to be reproduced. In this way, from the complementary negative, a positive is gained which, by the double correction of the spectroscopic deficiencies of the coloring and sensitizing matters, is free from the detrimental inaccuracies arising without the use of the invention. This positive, too, still gains when contemplated in light according to the invention.

In the same way it is also possible to copy a negative from a positive produced by conversion from a negative.

In all cases, objects being at rest may be photographed under successive application of the single maximum lights instead of with simultaneously applied mixed lights. The same is true for copying the positives.

I claim:

1. A method of three color photography which comprises photographing the colored object on a three-layer color-selective photographic material containing image forming dyes by means of light transmitted through a filter containing a neodymium compound, a fluorescein compound and a dye selected from the group consisting of rhodamine and fuchsine in subtractive combination.

2. A method, as claimed in claim 1, in which the filter is provided in front of the source of light.

3. A method, as claimed in claim 1, in which the filter is applied to the object as a coating.

4. A method, as claimed in claim 1, in which the filter is arranged between the object and the photographic material.

5. A method for intensifying the colors emitted from a multi-colored object having colors in subtractive combination, which method consists in eliminating from the light emitted from said multi-colored object substantially all colors with exception of those of 450, 550 and 650 m$\mu$ corresponding substantially to the spectroscopic perception maxima of the human eye, whereby especially the light rays in the neighborhood of 500 m$\mu$ and 580 m$\mu$ are eliminated from the light emitted from the object.

6. A method, as claimed in claim 5, wherein said multi-colored object is illuminated by light constituted exclusively by spectral waves of about 450, 550 and 650 m$\mu$.

7. A method, as claimed in claim 5, wherein a color filter is placed in the path of the light rays emitted from said multi-colored object, said filter filtering off substantially all light rays except those corresponding to 450, 550 and 650 m$\mu$.

8. A method for color photographing a multi-colored object in a subtractive process by means of light sensitive layers each containing one coloring substance, which method consists in making the exposure with light corresponding to the spectroscopic perception maxima of the human eye of 450, 550 and 650 m$\mu$ to the substantial elimination of all other light rays, and effecting the printing step with light corresponding to the absorption maxima of the individual coloring substances present in the light sensitive layers.

FERDINAND LEIBER.